United States Patent
Schuerg et al.

(10) Patent No.: US 11,136,912 B2
(45) Date of Patent: Oct. 5, 2021

(54) METHOD FOR OPERATING AN EXHAUST GAS PURIFICATION APPARATUS

(71) Applicant: Dr. Ing. h.c. F. Porsche Aktiengesellschaft, Stuttgart (DE)

(72) Inventors: Frank Schuerg, Gerlingen (DE); Sebastian Hemminger, Oberriexingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/798,499

(22) Filed: Feb. 24, 2020

(65) Prior Publication Data
US 2020/0271041 A1    Aug. 27, 2020

(30) Foreign Application Priority Data
Feb. 22, 2019 (DE) .................... 10 2019 104 511.8

(51) Int. Cl.
*F01N 11/00* (2006.01)
*F01N 13/00* (2010.01)
(Continued)

(52) U.S. Cl.
CPC .......... *F01N 11/007* (2013.01); *F01N 3/2046* (2013.01); *F01N 3/30* (2013.01);
(Continued)

(58) Field of Classification Search
CPC .. F01N 11/007; F01N 13/0093; F01N 13/011; F01N 3/0205; F01N 3/055;
(Continued)

(56) References Cited

U.S. PATENT DOCUMENTS

| 2004/0187484 A1* | 9/2004 | Bidner | F02D 17/02 60/299 |
| 2005/0028518 A1* | 2/2005 | Li | F01N 3/0814 60/300 |

(Continued)

FOREIGN PATENT DOCUMENTS

| DE | 10 2011 007 364 | 10/2012 |
| DE | 10 2013 226 063 | 6/2015 |

(Continued)

OTHER PUBLICATIONS

Machine Translation of DE 102013226063 A1 to Markus (Year: 2015).*
German Office Action dated Feb. 10, 2020.

*Primary Examiner* — Brandon D Lee
(74) *Attorney, Agent, or Firm* — Gerald E. Hespos; Michael J. Porco; Matthew T. Hespos (57) ABSTRACT

A method for operating an exhaust gas purification apparatus (10) of a vehicle includes monitoring close-coupled lambda value (Ln) of a close-coupled catalytic converter apparatus (20), operating the close-coupled catalytic converter apparatus (20) with an excess of fuel, monitoring a non-close-coupled lambda value (Lf) of a non-close-coupled catalytic converter apparatus (30), and operating the non-close-coupled catalytic converter apparatus (30) in a stoichiometric method of operation.

8 Claims, 6 Drawing Sheets

(51) Int. Cl.
*F01N 3/20* (2006.01)
*F01N 3/30* (2006.01)
*F02D 41/02* (2006.01)

(52) U.S. Cl.
CPC ........ *F01N 13/0093* (2014.06); *F01N 13/011* (2014.06); *F02D 41/025* (2013.01); *F01N 2430/06* (2013.01); *F01N 2560/025* (2013.01); *F01N 2560/14* (2013.01); *F01N 2900/1602* (2013.01)

(58) Field of Classification Search
CPC .......... F01N 3/101; F01N 3/2046; F01N 3/30; F01N 9/00; F01N 2240/02; F01N 2430/06; F01N 2560/025; F01N 2560/14; F01N 2900/1602; F02D 41/008; F02D 41/025; F02B 37/007
See application file for complete search history.

(56) References Cited

U.S. PATENT DOCUMENTS

2012/0144804 A1* 6/2012 Mendez ................. F28D 15/00
  60/274
2012/0260631 A1 10/2012 Winkler et al.

FOREIGN PATENT DOCUMENTS

DE      102013226063 A1 *  6/2015  ......... F02D 41/0235
DE     10 2016 202 799       8/2017

* cited by examiner

METHOD FOR OPERATING AN EXHAUST GAS PURIFICATION APPARATUS

CROSS REFERENCE TO RELATED APPLICATION

This application claims priority under 35 USC 119 to German Patent Appl. No. 10 2019 104 511.8 filed on Feb. 22, 2019, the entire disclosure of which is incorporated herein by reference.

BACKGROUND

Field of the Invention

The invention relates to a method for operating an exhaust gas purification apparatus, and to an exhaust gas purification apparatus for an internal combustion engine of a vehicle.

Prior Art

Vehicles with internal combustion engines have exhaust gas purification apparatuses. The exhaust gas purification apparatus of this type usually is equipped with a multiple-stage catalytic converter. This frequently is a two-stage catalytic converter apparatus with a close-coupled catalytic converter apparatus and a non-close-coupled catalytic converter apparatus. The close-coupled catalytic converter apparatus and the non-close-coupled catalytic converter apparatus usually are operated in stoichiometric operation so that the lambda values of the two catalytic converter apparatuses are kept identically or substantially identically in the range around 1.

There are some technical disadvantages with the above-described known catalytic converter apparatus. In particular, there is undesirably slow heating of the non-close-coupled catalytic converter apparatus. The non-close-coupled catalytic converter apparatus serves only for the after treatment of the residual exhaust gases from the first close-coupled catalytic converter apparatus. Thus, there are relatively few reactants to increase a temperature of the non-close-coupled catalytic converter apparatus via exothermic heating processes and chemical reactions. The slow heating after a cold start leads to a long time before the desired catalytic converter temperature for complete operation is reached. At the same time, however, relatively rapid heating takes place in the close-coupled catalytic converter apparatus due to the closeness to the internal combustion engine. In the case of a very high load on the internal combustion engine, in particular under full load, this leads to very high thermal loading of the close-coupled catalytic converter apparatus. Thus, the close-coupled catalytic converter apparatus has to be designed for cold start operation with a high operational catalytic converter performance, and the material of the close-coupled catalytic converter apparatus also has to be designed for high thermal loading. This leads to increased costs and increased weight of the exhaust gas purification apparatus.

It is an object of the invention to eliminate or reduce these disadvantages. In particular, it is an object of the invention to lower the material loading of the catalytic converter apparatuses in an inexpensive and simple way, while at the same time accelerating the heating of a non-close-coupled catalytic converter apparatus.

The above object is achieved by a method having the features set forth in the following description and the drawings. Features and details that are described in conjunction with the method of the invention also apply to the exhaust gas purification apparatus of the invention, and vice versa, so that reference always can be made mutually with regard to the disclosure in respect of individual aspects of the invention.

SUMMARY

The invention relates to a method for operating a vehicle that has a multi-stage exhaust gas purification apparatus with a close-coupled catalytic converter and a non-close coupled catalytic converter. The method comprises; operating the engine of the vehicle and monitoring a close-coupled lambda value of the close-coupled catalytic converter apparatus. The method then may adjust the operation of the engine by, for example, providing excess fuel to achieve a lambda value of less that 1.0 at the close coupled catalytic converter. The method continues by monitoring the non-close catalytic converter and adjusting the operation of the non-close catalytic converter to achieve a stoichiometric operation. The adjusting of the operation of the non-close catalytic converter may include cooling the flow into the non-close catalytic converter and/or feeding additional air or an air mixture into the non-close catalytic converter.

The method of the invention may be based on known exhaust gas apparatuses with two-stage catalytic converter apparatuses. A close-coupled catalytic converter apparatus and a non-close-coupled catalytic converter apparatus are to be understood to mean the catalytic converter apparatuses in a common exhaust gas stream between the internal combustion engine on one end and an exhaust gas outlet into the environment on the other end. According to the invention, the two catalytic converter apparatuses are operated with different lambda values and therefore in different methods of operation. The operation of the close-coupled catalytic converter apparatus can take place in a manner that is controlled by monitoring the close-coupled lambda value. According to an aspect of the invention, an excess of fuel is used for the operation of the close-coupled catalytic converter apparatus so that the close-coupled lambda value is kept at <1. This can also be called a rich fuel mixture in the case of the operation of the close-coupled catalytic converter apparatus. The rich method of operation with an excess of fuel in the close-coupled catalytic converter apparatus leads to a modified chemical reaction taking place in the close-coupled catalytic converter apparatus at least in part. In particular, focusing is carried out on what are known as lean contaminants, mainly nitrogen oxides, in the first catalytic converter apparatus. This allows the exothermic reactions in the first catalytic converter apparatus to be reduced so that a heating process can be reduced from chemical viewpoints. The thermal loading of the first close-coupled catalytic converter apparatus can be reduced in this way. The method of operation in the non-close-coupled catalytic converter apparatus is designed in a stoichiometric manner to compensate for the catalytic converter action of the close-coupled catalytic converter apparatus, which catalytic converter action is reduced in this way. For this purpose, the non-close-coupled lambda value is kept in the range around 1 by way of the monitoring of the non-close-coupled lambda value. It becomes possible in this way to convert even the rich pollutants, namely, carbon monoxide and hydrocarbon compounds in the non-close-coupled catalytic converter apparatus. A greater conversion then takes place in the chemical method of operation of the non-close-coupled catalytic converter apparatus, and the exothermic action of the catalytic converter function is increased in the non-closecoupled catalytic converter apparatus. In other words, the remaining contaminants downstream of the close-coupled catalytic converter apparatus are converted in the non-close-coupled catalytic converter apparatus in contrast to the prior art, with the result that more chemical heat output is available to heat the non-close-coupled catalytic converter apparatus more rapidly via exothermic catalytic converter reactions.

As explained above, the thermal loading of the close-coupled catalytic converter apparatus can be reduced by way operation with an excess of fuel. Although the thermal loading as a result of thermal conduction from the internal combustion engine remains, the thermal loading as a result of individual exothermic reaction is reduced. Thus, the overall thermal loading for the close-coupled catalytic converter apparatus can be reduced so that that the close-coupled catalytic converter apparatus can be optimized with regard to material selection, size and weight. At the same time, the boosted catalytic converter function in the non-close-coupled catalytic converter apparatus can lead in a stoichiometric way to boosted and more rapid thermal heating. In comparison with the prior art, more rapid heating can be ensured, particularly in cold start situations or in part load operation of the internal combustion engine.

To summarize the preceeding comments, the method of the invention enables the close-coupled catalytic converter apparatus to be protected thermally and at the same time the non-close-coupled catalytic converter apparatus can be heated thermally more rapidly.

The method can yield benefits if additional gas, in particular additional air and/or an additional air mixture, is fed in to the non-close-coupled catalytic converter apparatus for the stoichiometric method of operation. Thus, a greater flexibility and a greater functional freedom are achieved. The method connects the close-coupled catalytic converter apparatus and the non-close-coupled catalytic converter apparatus one another in series, and this method of operation can be called a serial split method of operation. By virtue of the fact that additional gas, for example external air or air from the intake section of a turbo engine, can be introduced into the non-close-coupled catalytic converter apparatus, the actual composition downstream of the close-coupled catalytic converter apparatus can be reacted to in a flexible manner. Therefore, the method of operation of the close-coupled catalytic converter apparatus and the non-close-coupled catalytic converter apparatus can be set in a more flexible manner.

The method further may comprise selectively cooling the exhaust gas stream between the close-coupled catalytic converter apparatus and the non-close-coupled catalytic converter apparatus. This selective cooling allows the actual temperature in the respective catalytic converter apparatus to be influenced in a more flexible manner. Additional thermal cooling of the non-close-coupled catalytic converter apparatus can be ensured in this way in full load operation of the internal combustion engine. Selective or switchable cooling decisions can be made based on whether the non-close-coupled catalytic converter apparatus is to be operated in an uncooled manner for rapid heating operation or in a cooled manner, for example, under full load to avoid thermal loading.

The method can be carried out only, or substantially only, in part load operation and/or in start operation of an internal combustion engine. Thus, the method may not be carried out under full load of the internal combustion engine, and a stoichiometric catalysis may be set as operating mode in all catalytic converter apparatuses. The full load situation of the internal combustion engine therefore may be free of the method steps of the invention. This allows the advantages of the invention to be achieved for the non-full load operation, while operation of the catalytic converter apparatuses can be optimized to other operating parameters in full load operation.

Alternatively, the method of the invention may be carried out under full load.

Still further, the method of the invention may be carried out only under full load and only as soon as the temperature of the close-coupled catalytic converter exceeds a limit temperature.

The method of the invention can be adapted to a vehicle with an internal combustion engine that has two cylinder sections, with each cylinder section having a specific close-coupled catalytic converter apparatus and with the catalytic converter apparatuses being operated with opposed, in particular complementary lambda values. For example, sports vehicles frequently have internal combustion engines with plural cylinder banks. Thus, six cylinders can be provided in line or in a V-like design. The same also applies to eight cylinder, ten cylinder or even twelve cylinder engines. Two or more cylinder sections also can be configured as separate parts of the internal combustion engine. In accordance with this aspect of the method, a specific dedicated close-coupled catalytic converter apparatus is provided for each cylinder section. This therefore means that, in the case of two cylinder sections, two separate close-coupled catalytic converter apparatuses are also provided and communicate with a common non-close-coupled catalytic converter apparatus combining the exhaust gas streams from the two separate close-coupled catalytic converter apparatuses. In this embodiment, the two close-coupled catalytic converter apparatuses are operated in an opposed manner. This means that the lambda values lie on different sides of a stoichiometric method of operation. In particular, the first close-coupled catalytic converter apparatus for the first cylinder section is operated, for example, in a rich method of operation, whereas the second close-coupled catalytic converter apparatus for the second cylinder section is operated in a lean method of operation. The opposed lambda values may be complementary or substantially complementary lambda values and therefore differ substantially by the same amount from the stoichiometric method of operation. In other words, the lambda values of the two separate close-coupled catalytic converter apparatuses, which lambda values differ from the stoichiometric method of operation, complement one another again first stoichiometric operation by being combined in a common exhaust gas stream automatically or substantially automatically for the following non-close-coupled catalytic converter apparatus. It is possible in this way for the advantages of the invention to be designed and maintained in a simple and flexible manner, without a separate gas supply for the stoichiometric method of operation of the non-close-coupled catalytic converter apparatus being necessary.

The invention also relates to an exhaust gas purification apparatus for an internal combustion engine. The exhaust gas purification apparatus has a close-coupled catalytic converter apparatus and a non-close-coupled catalytic converter apparatus with a close-coupled sensor unit for monitoring the close-coupled lambda value of the close-coupled catalytic converter apparatus. Furthermore, a non-close-coupled sensor unit is provided for monitoring a non-close-coupled lambda value of the non-close-coupled catalytic converter apparatus. Moreover, a control module is provided for operating the close-coupled catalytic converter apparatus with an excess of fuel and for operating the non-close-coupled catalytic converter apparatus in a stoichiometric method of operation. The control module may be designed for carrying out a method according to the invention.

An exhaust gas purification apparatus according to the invention therefore yields the same benefits as have been described in detail in relation to the method of the invention. The catalytic converter apparatuses are in a fluid-communicating connection to one another for conducting the exhaust gas stream.

The exhaust gas purification apparatus of the invention may have a gas inlet between the close-coupled catalytic converter apparatus and the non-close-coupled catalytic converter apparatus for an inlet of an additional gas, in particular of additional air and/or an additional gas mixture. The gas inlet may be connected to a pumping apparatus and/or a gas source. The additional gas inlet allows the above-described increase in the flexibility in the method of operation, with the result that an active influence can be made on the stoichiometric method of operation of the non-close-coupled catalytic converter apparatus. The use of a pumping apparatus allows an air mixture or air from the environment of the vehicle to be introduced as additional gas into the gas inlet. In addition or as an alternative, however, a gas source can be the intake manifold of a turbo apparatus upstream of the internal combustion engine.

The exhaust gas purification apparatus may have a cooling apparatus between the close-coupled catalytic converter apparatus and the non-close-coupled catalytic converter apparatus for cooling the exhaust gas stream from the close-coupled catalytic converter apparatus to the non-close-coupled catalytic converter apparatus. Cooling media, for example, can be water or air. The cooling apparatus can provide active or passive cooling. The cooling apparatus may inject a cooling medium, such as water. Thus, the thermal loading of the non-close-coupled catalytic converter apparatus can be reduced even in full load operation. The cooling apparatus may be selective switchable between different cooling states. Switching, the cooling apparatus off can be important when the internal combustion engine is in cold start operation.

The exhaust gas purification apparatus may have at least one additional sensor unit between the close-coupled catalytic converter apparatus and the non-close-coupled catalytic converter apparatus for determining at least one intermediate lambda value. This allows monitoring of the above-described method to be carried out between the catalytic converter apparatuses. Two additional sensor units of this type may be provided for embodiments where a gas inlet is provided for the introduction of an additional gas, and these two sensor units may be provided respectively on the two sides of the gas inlet. These sensors allow a closed loop or open loop control of the influence of the introduced gas on the respective lambda values to be carried out in a more exact manner.

An internal combustion engine with two cylinder sections may have a specific close-coupled catalytic converter apparatus for each cylinder section, and the control module may operate the two close-coupled catalytic converter apparatuses with opposed or complementary lambda values. This exhaust gas stream downstream of the two close-coupled catalytic converter apparatuses then can be brought together to a common non-close-coupled catalytic converter apparatus. As described above, the opposed or complementary lambda values during operation of the close-coupled catalytic converter apparatuses can lead in a balanced manner substantially automatically or completely automatically to the stoichiometric method of operation of the non-close-coupled catalytic converter apparatus.

Further advantages and details of the invention result from the following description, in which exemplary embodiments are described in detail with reference to the drawings. Features mentioned in the claims and in the description can be essential to the invention in each case individually per se or in any desired combination.

DETAILED DESCRIPTION

Figure 1:
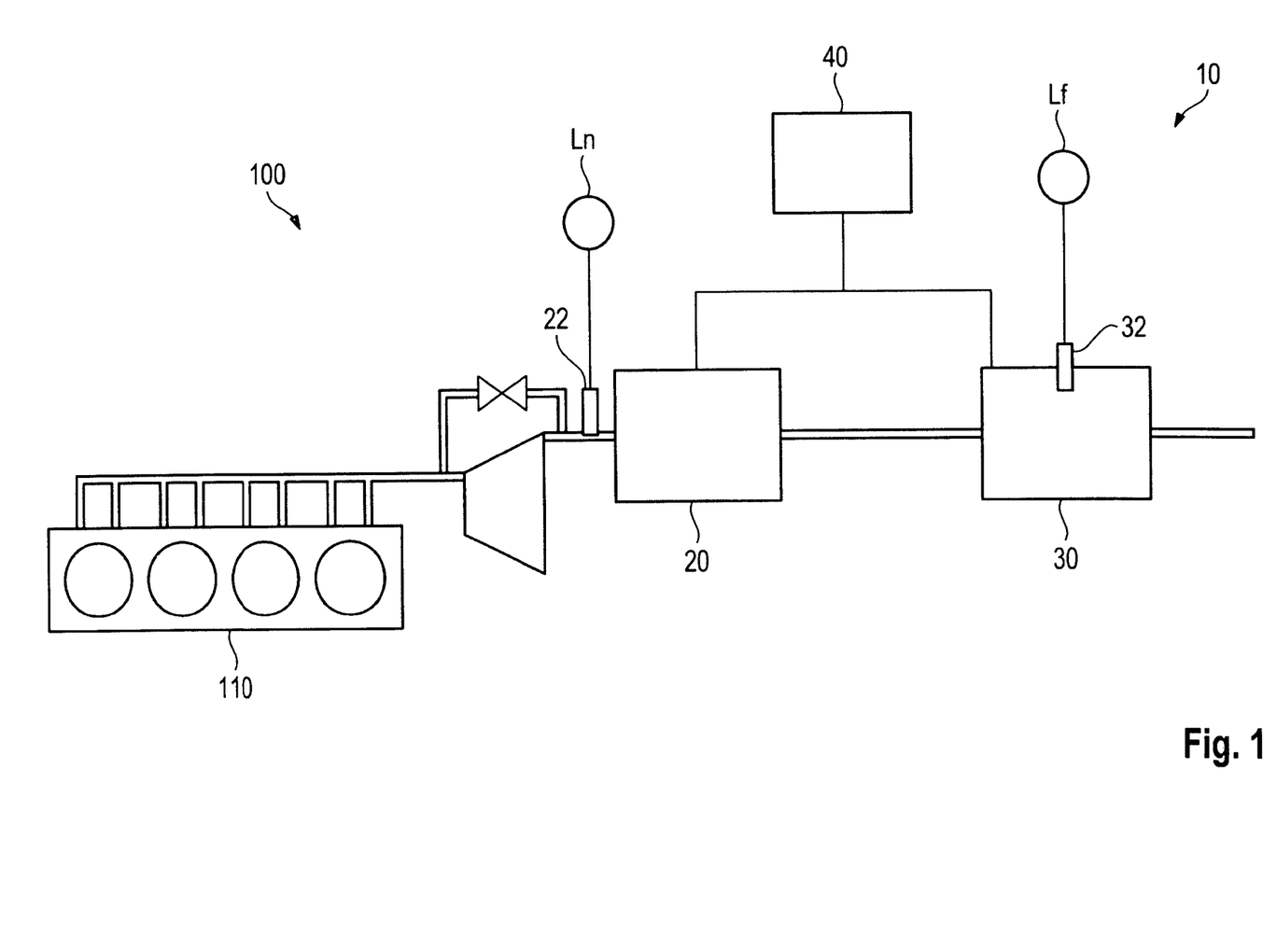
FIG. 1 shows a first embodiment of an exhaust gas purification apparatus according to the invention.

FIG. 1 shows a particularly simple refinement of an exhaust gas purification apparatus 10 according to the invention. Here, the internal combustion engine 100 is shown with a single cylinder section 110 with four individual cylinders which are shown diagrammatically here. A common collecting line is provided at the outlets of the individual cylinders of the cylinder section 110 and introduces the exhaust gas stream either via a diagrammatically shown wastegate valve or an exhaust gas turbine into the close-coupled catalytic converter apparatus 20. A close-coupled sensor unit 22 is provided for monitoring the close-coupled lambda value Ln. Starting from the outlet downstream of the close-coupled catalytic converter apparatus 20. The exhaust gas stream is introduced after this first treatment into a non-close-coupled catalytic converter apparatus 30 to subject the exhaust gas stream to final treatment and purification. A non-close-coupled sensor unit 32 is situated here to monitor the non-close-coupled lambda value Lf.

A control module 40 can operate the close-coupled catalytic converter apparatus 20 with an excess of fuel and the non-close-coupled catalytic converter apparatus 30 in a stoichiometric operating method by way of the input values of the close-coupled lambda value Ln and the non-close-coupled lambda value Lf. This allows a reduction of the thermal loading of the close-coupled catalytic converter apparatus 20 and more rapid heating of the non-close-coupled catalytic converter apparatus 30.

Figure 2:
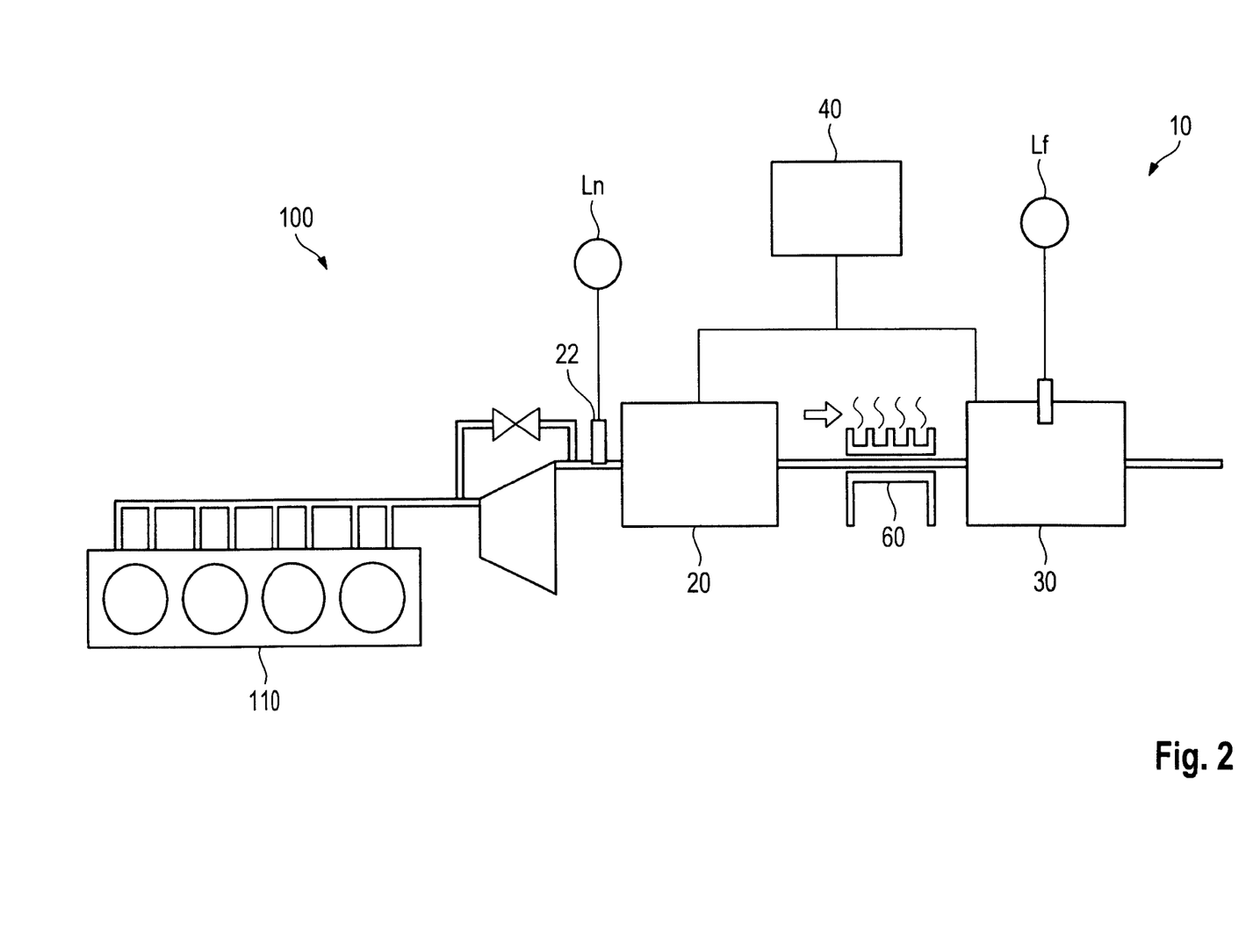
FIG. 2 shows a further embodiment of an exhaust gas purification apparatus according to the invention.

FIG. 2 shows an alternate configuration of the embodiment of FIG. 1 where a cooling apparatus 60 is provided to reduce the thermal loading of the non-close-coupled catalytic converter apparatus 30 even in full load operation. This allows the exhaust gas stream to be cooled in an active or passive way in the case of the transfer from the close-coupled catalytic converter apparatus 20 into the non-close-coupled catalytic converter apparatus 30.

Figure 3:
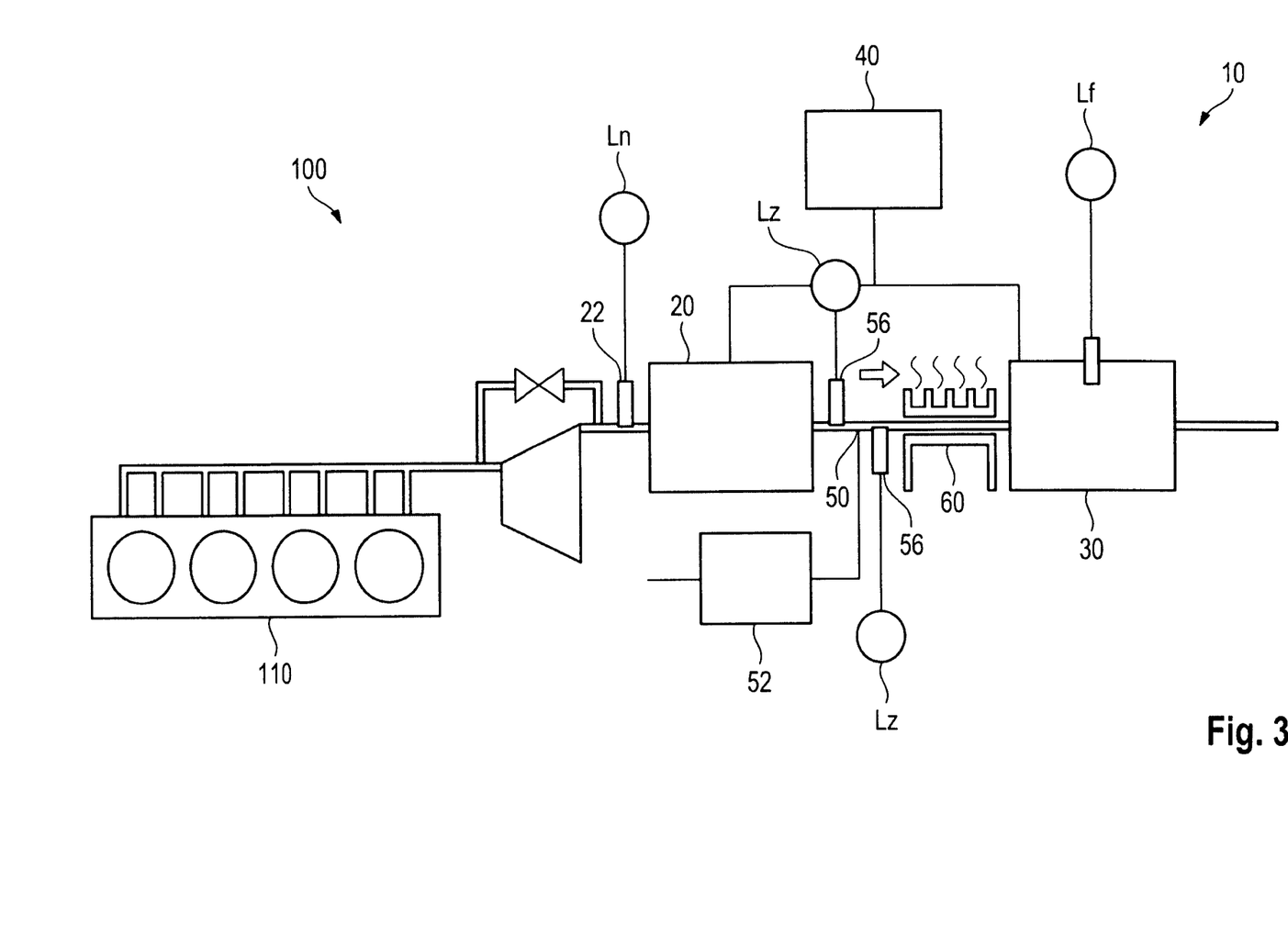
FIG. 3 shows a further embodiment of an exhaust gas purification apparatus according to the invention.

FIG. 3 shows an alternate configuration of the embodiment of FIG. 2 where a gas inlet 50 is provided between the two catalytic converter apparatuses 20 and 30 for introducing an additional gas, in particular air or an air mixture, into the exhaust gas stream. The mixing is possible via a pumping apparatus 52. Moreover, two additional sensor units 56 allow intermediate lambda values Lz to be made available and to be forwarded to the control module 40 for evaluation and use of the control.

Figure 4:
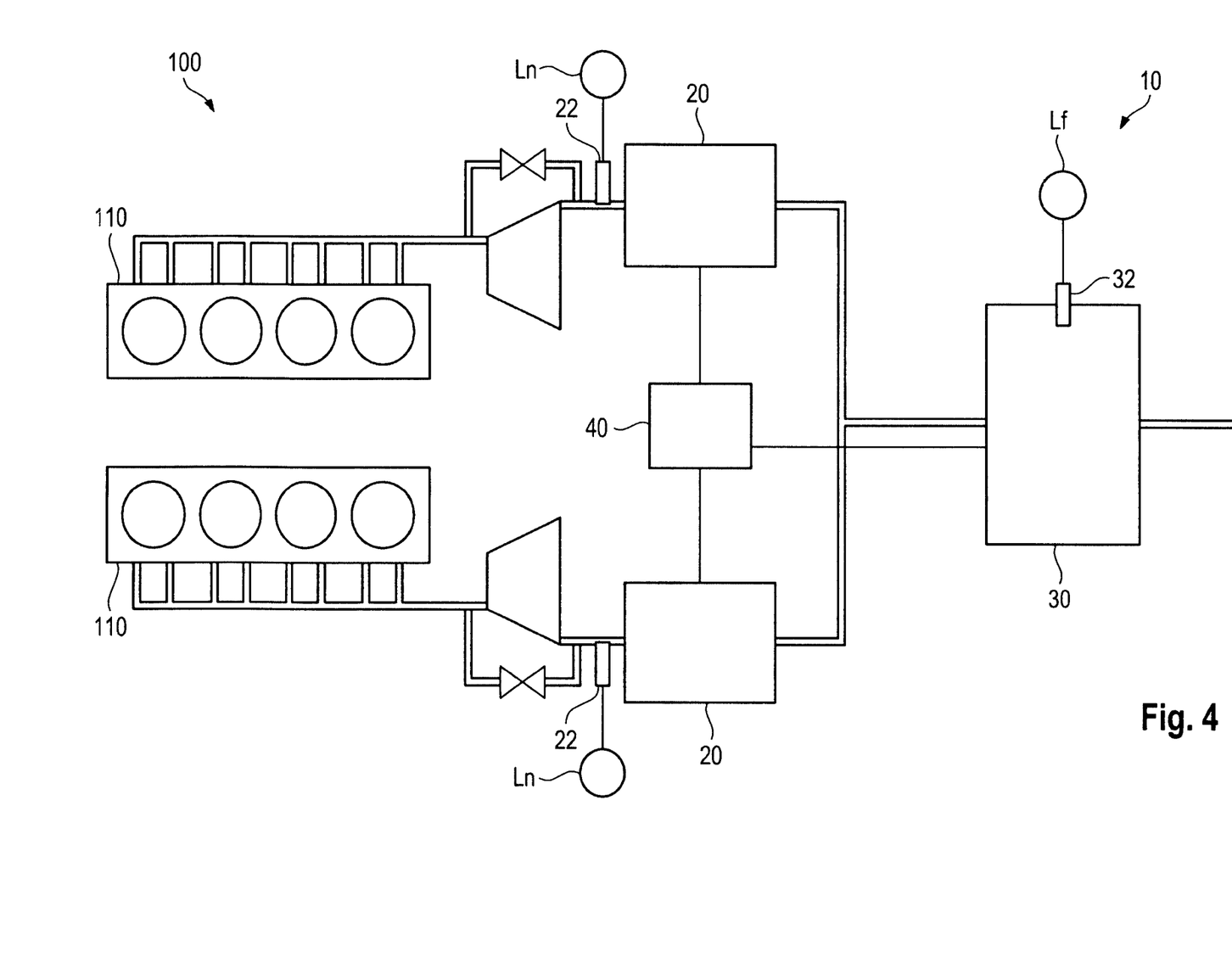
FIG. 4 shows a further embodiment of an exhaust gas purification apparatus according to the invention.

FIG. 4 shows one embodiment of the internal combustion engine 100 with first and second separate cylinder sections 110, each of which has four cylinders. The first and second cylinder sections 110 respectively produce first and second exhaust gas streams that are conducted in each case either via the wastegate valve or the associated turbine to respective first and second separate and specifically associated close-coupled catalytic converter apparatuses 20. Subsequently, the exhaust gas stream can be combined downstream of the first and second close-coupled catalytic converter apparatuses 20, and can be fed to a common non-close-coupled catalytic converter apparatus 30. A control module 40 also is provided for carrying out the method of the invention. Care is taken in this embodiment for monitoring of the close-coupled lambda values Ln so that, for example, the upper of the two close-coupled catalytic converter apparatuses 20 is operated with a rich operating mixture and the lower of the two close-coupled catalytic converter apparatuses 20 is operated with a correspondingly leaner operating mixture. This leads to the two close-coupled catalytic converter apparatuses 20 being operated in a complementary lambda operating method with respect to the above-described stoichiometric equalization in the exhaust gas stream for the non-close-coupled catalytic converter apparatus 30. Thus, a separate pumping apparatus 52 or an associated gas inlet 50 are no longer necessary to increase the flexibility for the stoichiometry.

Figure 5:
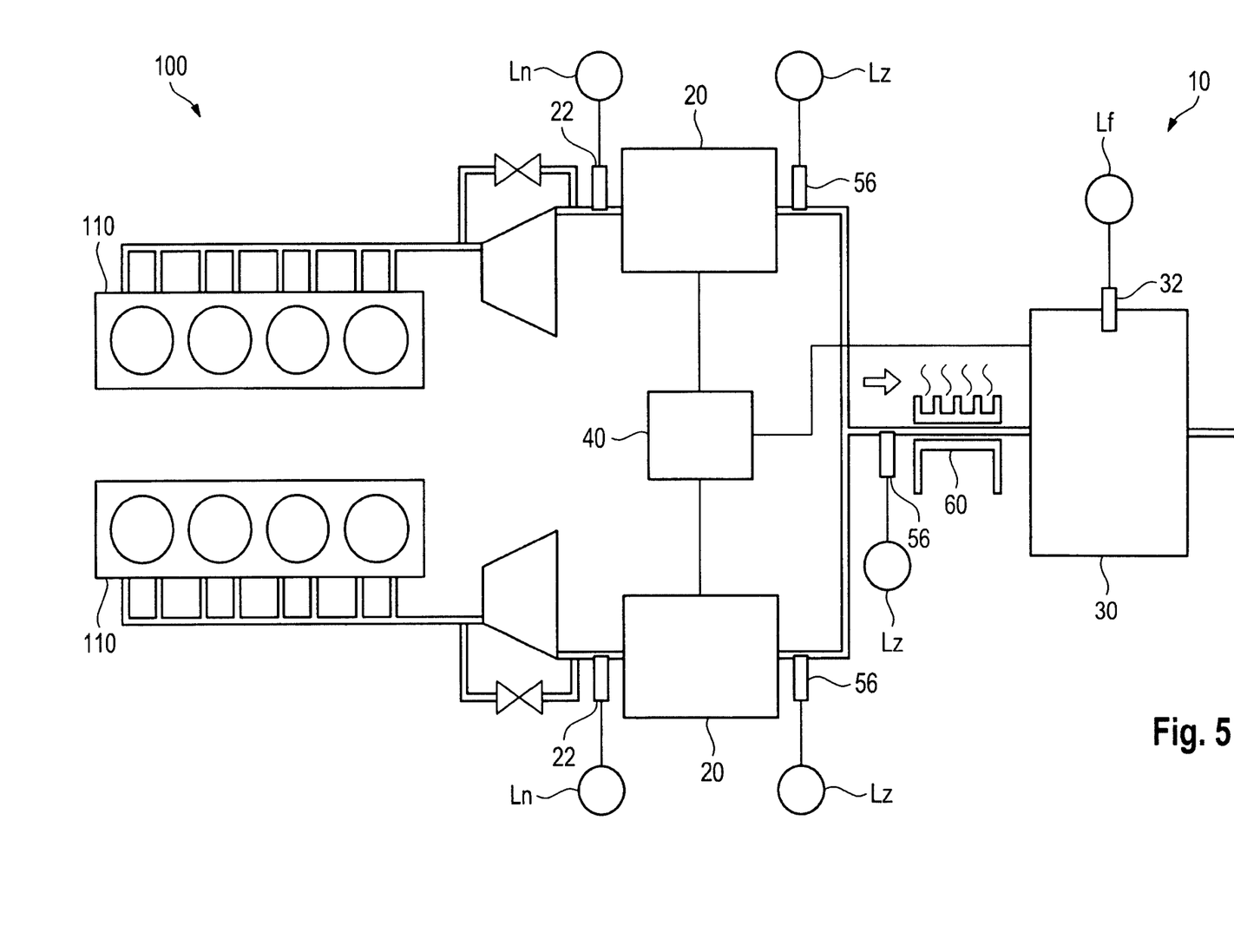
FIG. 5 shows a further embodiment of an exhaust gas purification apparatus according to the invention.
Figure 6:
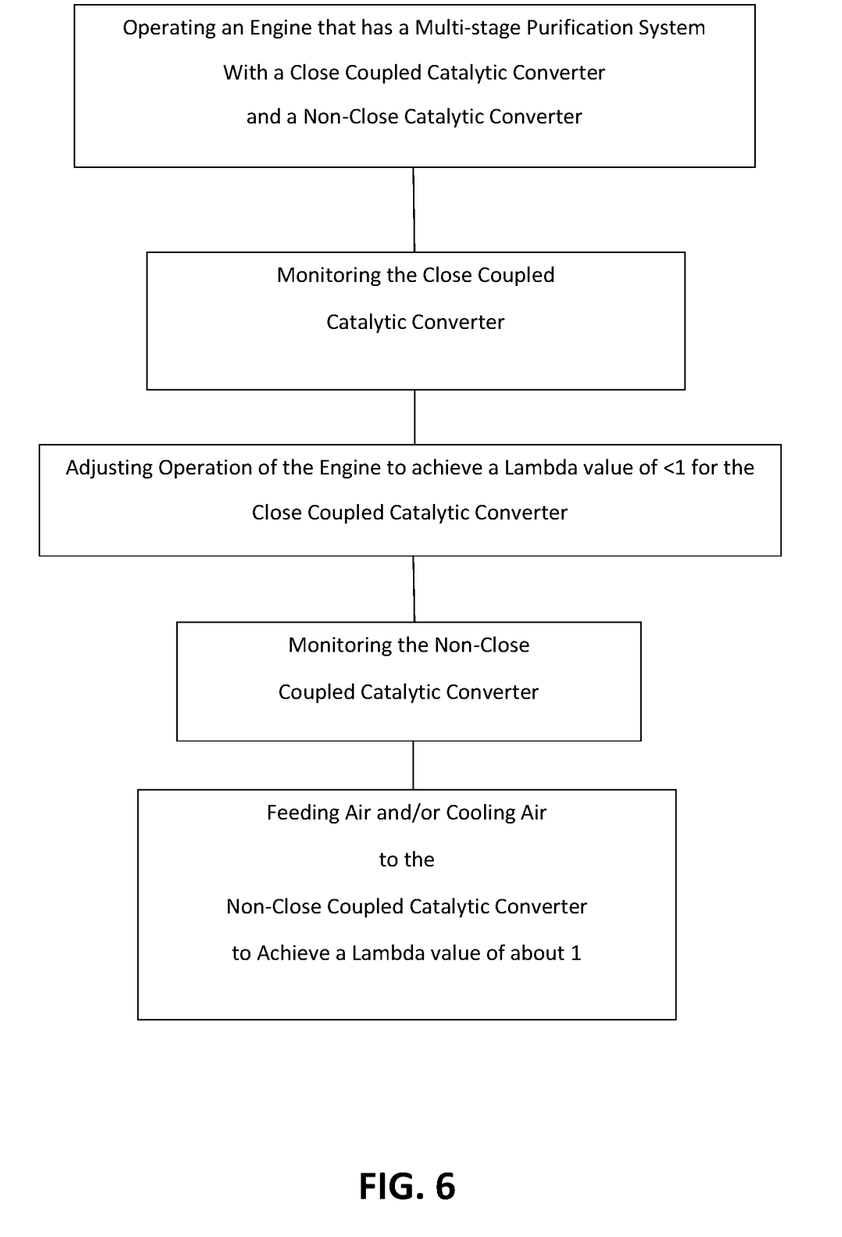
FIG. 6 is a flow chart to show one embodiment of the method of the invention.

FIG. 5 shows an alternate configuration of the embodiment of FIG. 4 and includes a cooling apparatus 60 that can be of identical configuration to the cooling apparatus described with reference to FIGS. 2 and 3. A total of three additional sensor units 56 for corresponding recording of additional intermediate lambda values Lz are also shown here.

The above description of the embodiments describes the present invention exclusively within the context of examples. However, individual features of the embodiments can be combined freely with one another, in so far as technically appropriate, without departing from the scope of the invention.

What is claimed is:

1. A method for operating an exhaust gas purification apparatus for purifying an exhaust gas stream of a vehicle, the exhaust gas purification apparatus including a close-coupled catalytic converter apparatus and a non-close-coupled catalytic converter apparatus, the method comprising:
monitoring a first lambda value at a first position, the first position being upstream of the close-coupled catalytic converter apparatus,
operating the close-coupled catalytic converter apparatus with an excess of fuel,
monitoring a second lambda value at a second position, the second position being downstream of the close-coupled catalytic converter apparatus and upstream of the non-close-coupled catalytic converter apparatus,
selectively feeding external air or an external air mixture into an external air inlet of the exhaust gas purification apparatus downstream of the second position,
monitoring a third lambda value at a third position, the third position being downstream of the external air inlet and upstream of the non-close-coupled catalytic converter apparatus,
selectively cooling the exhaust gas stream between the third position and the non-close-coupled catalytic converter apparatus,
monitoring a fourth lambda value at the non-close-coupled catalytic converter apparatus, and
operating the non-close-coupled catalytic converter apparatus in a stoichiometric method of operation.

2. The method of claim 1, wherein all of the method steps are carried out only in part load operation and/or in starting operation of an internal combustion engine of the vehicle.

3. The method of claim 1, wherein the all of the method are carried out only in full load operation of an internal combustion engine of the vehicle.

4. The method of claim 1, wherein the method is carried out only in part load operation of the internal combustion engine of the vehicle and when the close-coupled catalytic converter apparatus exceeds a limit temperature.

5. A method for operating an exhaust gas purification apparatus for purifying an exhaust gas stream of a vehicle, the vehicle having an internal combustion engine with first and second cylinder sections coupled respectively to first and second close-coupled catalytic converter apparatuses and a single non-close-coupled catalytic converter apparatus connected to the first and second close-coupled catalytic converter apparatuses, the method comprising:
monitoring first and second lambda values at first and second positions in proximity respectively to the first and second close-coupled catalytic converter apparatuses;
operating the first close-coupled catalytic converter apparatus so that the first lambda value is greater than 1 by a specified amount and operating the second close-coupled catalytic converter apparatus so that the second lambda value is less than 1 by the specified amount so that the first and second close-coupled catalytic converter apparatuses are operated to have complementary lambda values;
monitoring at least one lambda value in proximity to the non-close-coupled catalytic converter apparatus; and
operating the non-close-coupled catalytic converter apparatus in a stoichiometric method of operation.

6. An exhaust gas purification apparatus for purifying an exhaust gas stream from an internal combustion engine of a vehicle, the internal combustion engine having first and second cylinder sections, comprising:
first and second close-coupled catalytic converter apparatuses communicating respectively with the first and second cylinder sections;
a non-close-coupled catalytic converter apparatus communicating with the first and second close-coupled catalytic converter apparatuses;
a cooling apparatus between the first and second close-coupled catalytic converter apparatuses and the non-close-coupled catalytic converter apparatus for cooling the exhaust gas stream from the first and second close-coupled catalytic converter apparatuses to the non-close-coupled catalytic converter apparatus;
a first and second close-coupled sensor units for monitoring close-coupled lambda values of the first and second close-coupled catalytic converter apparatuses respectively;
at least one non-close-coupled sensor unit for monitoring non-close-coupled lambda values of the non-close-coupled catalytic converter apparatus; and
a controller configured to:
selectively operating the cooling apparatus to cool the exhaust gas stream between the first and second close-coupled catalytic converter apparatuses and the non-close-coupled catalytic converter apparatus, selectively operating the first and second close-coupled catalytic converter apparatuses so that the first lambda value is greater than 1 by a specified amount and the second lambda value is less than 1 by the specified amount so that the first and second close-coupled catalytic converter apparatuses are operated to have complementary lambda values, and selectively operating the non-close-coupled catalytic converter apparatus in a stoichiometric method of operation.

7. The exhaust gas purification apparatus of claim 6 further comprising at least one additional sensor unit between the close-coupled catalytic converter apparatuses and the cooling apparatus for determining at least one intermediate lambda value.

8. The exhaust gas purification apparatus of claim 6 further comprising at least one additional sensor unit between the close-coupled catalytic converter apparatuses and the non-close-coupled catalytic converter apparatus for determining at least one intermediate lambda value.

\* \* \* \* \*